Jan. 13, 1931.   E. E. THIEL   1,789,028
PRINTER'S REGISTERING DEVICE
Filed Jan. 9, 1928    2 Sheets-Sheet 2

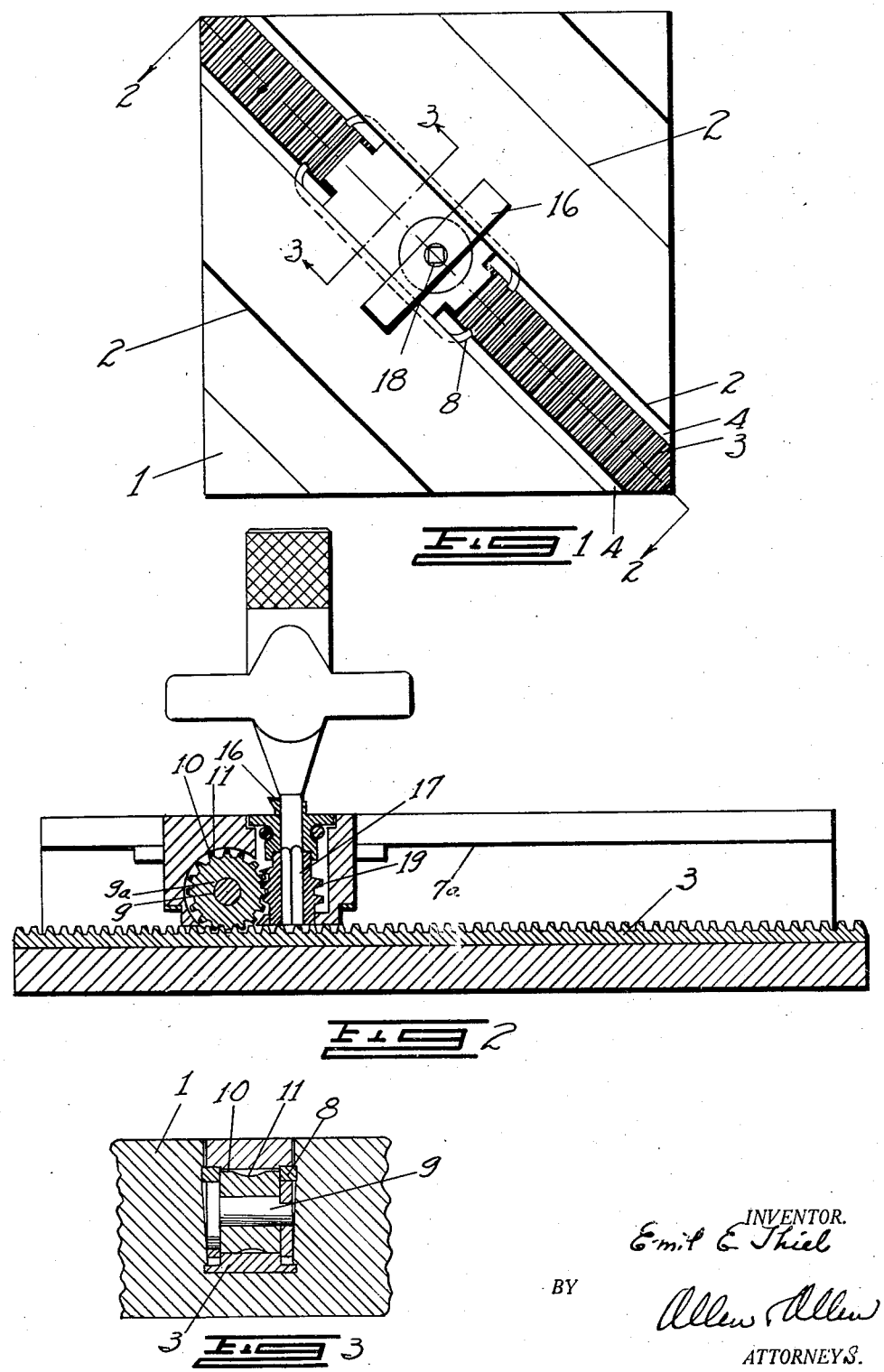

INVENTOR.
Emil E Thiel
BY
ATTORNEYS

Patented Jan. 13, 1931

1,789,028

UNITED STATES PATENT OFFICE

EMIL E. THIEL, OF CINCINNATI, OHIO, ASSIGNOR TO THE PRINTING MACHINERY COMPANY, OF CINCINNATI, OHIO, A CORPORATION OF OHIO

PRINTER'S REGISTERING DEVICE

Application filed January 9, 1928. Serial No. 245,305.

My invention relates to registering devices for printers' use with which printing plates may be held in registered position. Specifically my invention relates to improvements in registering devices of the type disclosed in the Warnock Patent #1,007,164.

In the Warnock registering device as disclosed in the aforenoted patent, a carrier is provided which has a worm gear driven by a worm mounted in vertical position within the carrier. The worm has rotatably mounted therein a clamping jaw. Extending down the axis of the clamping jaw is an aperture for the insertion of a key which fits within a key socket in the worm, so that by inserting the key, and turning it, the worm may be rotated. Mounted in an assembly coaxially with the worm gear are two toothed gears, one on each side of the worm gear, which gears engage the teeth of toothed track sections mounted on each side of a medial groove in the foundation plate. In the foundation plate having a groove between the toothed track sections ink runs down the walls of the groove and becomes smudged in the teeth of the rack where it hardens. Then there is no easy way to remove the hardened ink except by soaking the foundation plate. With the teeth of the rack covered with hardened ink the registering device becomes practically inoperable.

It is the object of my invention to provide a registering device operable on a similar principle as that disclosed in the aforenoted Warnock patent which shall have a single toothed track section extending medially down the center of each groove in the foundation plate. Thus, slots will be formed on each side of the toothed track, which slots will carry off excess ink and prevent the toothed track from becoming blocked up. It is further my object to incorporate in a unitary structure a pinion which will have worm gear engaging portions provided medially therein. It is also my object to provide a gear to engage the toothed track which will have an axle bearing which will firmly journal the gear instead of having bearing portions provided in the periphery of the worm gear.

The above and other objects which permit the manufacture of a stronger registering device with fewer component parts and to which reference will be made in the ensuing disclosure, I accomplish by that certain combination and arrangement of parts of which I have shown a preferred embodiment.

In the drawings:—

Figure 1 is a plan view of a foundation plate showing one of my novel registering devices in position.

Figure 2 is a sectional view taken along the lines 2—2 in Figure 1.

Figure 3 is a sectional view taken along the lines 3—3 in Figure 1.

Figure 4:
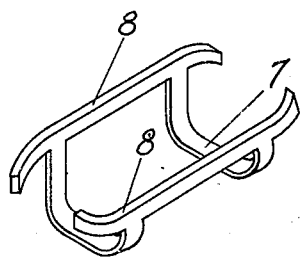
Figure 4 is a perspective view of the spring cage with which my registering device is retained within a groove in the foundation plate.
Figure 5:
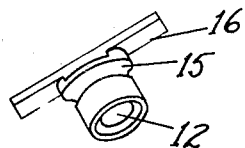
Figure 5 is a perspective view of the clamping jaw which is mounted in the carriage of the registering device.
Figure 6:
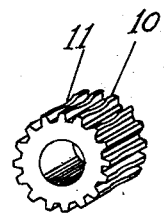
Figure 6 is a perspective view of my integrally formed pinion gear having medially disposed worm gear driving portions.
Figure 7:
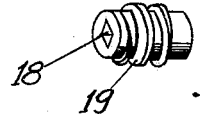
Figure 7 is a perspective view of the worm within the carriage.
Figure 8:
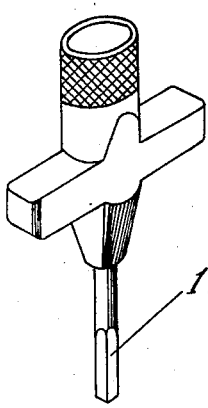
Figure 8 is a perspective view of a suitable key with which the worm may be rotated.
Figure 9:
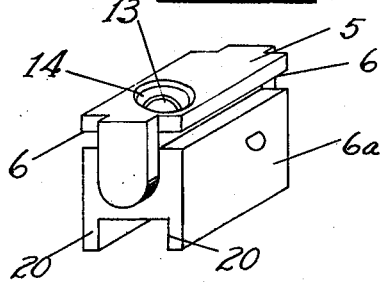
Figure 9 is a perspective view of the frame of the carriage for the registering device.

Referring first to the foundation plate, I have shown a fragmentary portion of such a plate at 1, the plate being provided with grooves 2 within which the registering devices are mounted. The grooves are provided with a medially disposed toothed track section 3 which extends substantially across the width of the groove with the ink slots 4 providing gutters on each side of the track.

The registering device has a frame generally indicated at 5 having channeled slots 6 on the sides 6a thereof for retaining the spring basket 7 as indicated in Figure 3 which holds the frame fairly rigidly within the slots. The slotted portions of the foundation plate have overhanging ledges 7a which the upper surfaces 8 of the spring basket arms bear against. Mounted on an axle 9 having flattened portions 9a at the ends to prevent rotation thereof, is the unitary pinion and worm wheel. This member has pinion gear teeth 10 cut in its outer periphery, and subsequently worm gear driving portions 11 cut medially therein. In the manufacture of the gear it is entirely optional which type of teeth are cut first in the pinion. The unitary member is mounted on the axle or journal 9, the axle being rounded medially and only having flattened portions at the ends which engage the walls 6a of the carriage frame.

The carriage frame has a recessed portion 13 having a flange 14 which provides a thrust bearing for the peripheral flange 15 of the neck of the jaw member. The jaw member has a clamping portion 16, which, in use, bears against a printing plate mounted on the foundation plate which is to be held in registered position thereon. Extending through the axis of the jaw member is an aperture 12 through which a key 17 may be inserted to engage a key socket 18 in the upper end of the worm 19. The frame has extensions 20 which extend into the ink slots during the movement of the registering device. The extensions provide a support and prevent the rocking of the registering device under tension. The extensions also tend to wipe out the slots.

The rotation of the worm by engagement with the worm gear portions 11 of the integral members rotates the pinion 10 which engages the teeth of the track 3. When the printing plate has been positioned properly, several of the registering devices similar to the one described herein, located in different positions and in different grooves, firmly hold the printing plate in place.

As has been noted, the unitary pinion and worm gear member provides a much stronger drive than in the aforenoted Warnock patent, in which pinions and a worm gear are mounted on an unjournaled shaft. Further, the ink slots prevent the track from becoming clogged up with hardened ink, because the engagement of the gear with the teeth of the track causes the ink to be squeezed outwardly into the slots.

While I have shown my novel registry device as an improvement particularly on the Warnock device, it is thought to be within the realms of mechanical equivalency to construct other types of devices with a combination worm drive and pinion, with the ink grooves at the sides of the rack member, which I consider to be the essence of my invention.

Having thus described my invention, what I claim as new and desire to secure by Letters Patent, is:—

1. In combination with a printing plate registering device having a housing, a medially mounted pinion within said housing, means for driving said pinion, a foundation plate having slots therein, with toothed tracks mounted medially within said slots, and ink slots at the sides of the tracks, said housing having depending sills to wipe said ink slots.

2. In combination with a printing plate registering device having a housing, a medially mounted pinion within said housing, means for driving said pinion, a foundation plate having slots therein, with toothed tracks mounted medially within said slots, ink slots at the sides of the tracks, said housing having downwardly extending members extending within said ink slots.

EMIL E. THIEL.